United States Patent [19]

Hall, Jr. et al.

[11] 4,112,300
[45] Sep. 5, 1978

[54] INFRARED ELECTRONIC COUNTERMEASURES

[75] Inventors: Freeman F. Hall, Jr.; Jerome J. Redmann, both of Los Angeles, Calif.

[73] Assignee: International Telephone and Telegraph Corporation, Nutley, N.J.

[21] Appl. No.: 567,346

[22] Filed: Jul. 18, 1966

[51] Int. Cl.$^2$ ............................................. G01J 1/00
[52] U.S. Cl. .................................... 250/330; 89/41 L; 250/333; 250/338; 250/342; 356/138
[58] Field of Search ........................ 88/1 U, 1 M, 1 Y; 250/83.3 IR, 199, 330, 333, 342, 338; 331/94.5; 178/6.8; 343/18 E, 6 ND; 313/94, 110, 111; 89/1 A, 41 L; 356/138

[56] References Cited

U.S. PATENT DOCUMENTS

| | | | |
|---|---|---|---|
| 2,989,744 | 6/1961 | Pettit | 343/18 E |
| 3,160,883 | 12/1964 | Buyer et al. | 343/18 E |
| 3,200,196 | 8/1965 | Jenkins | 178/6.8 |
| 3,200,250 | 8/1965 | Bouwers | 250/83.31 R |
| 3,258,771 | 6/1966 | Hardster | 343/18 E |
| 3,281,712 | 10/1966 | Koester | 250/199 X |
| 3,292,102 | 12/1966 | Byrne | 331/94.5 |
| 3,293,438 | 12/1966 | Davis | 250/199 |
| 3,311,844 | 3/1967 | Di Curcio | 331/94.5 |

OTHER PUBLICATIONS

De Ment: "New Developments in Laser Weapons;" vol. 22, No. 11, Electronic Industries, Nov. 1963, pp. 78–82.

*Primary Examiner*—S. C. Buczinski
*Attorney, Agent, or Firm*—John T. O'Halloran

[57] ABSTRACT

A device for jamming or damaging an enemy's infrared detection apparatus consists of the following equipment mounted on a tripod which is adjustable in azimuth and elevation: a multiple rod laser head emitting coherent light at more than one wavelength, an aiming telescope, a proximity focused image converter telescope, and an integrating image tube. The laser head is provided with a Q switch and collimating optics; the integrating image tube being adjustably mounted on the tripod so that it can be separately set for boresighting with the other instruments. In place of the laser head a generator of X-band microwave energy can be substituted.

7 Claims, 5 Drawing Figures

INFRARED ELECTRONIC COUNTERMEASURES

This invention relates to apparatus for providing infrared electronic countermeasures and more particularly to apparatus for jamming or damaging an enemy's infrared detection capability.

The advent of infrared equipment as a working tool of the military has occurred, and the expected use thereof will increase greatly during the next few years. Hence, it is necessary to provide some means of decreasing the effectiveness of the use of this equipment by an enemy; that is, effective countermeasures are required. Heretofore only "physical" countermeasures such as smoke screen shielding, heated decoys, and camouflage have been used, with some marginal success; but with increased sophistication is the infrared equipment being developed today, these "physical" countermeasures may and have proved inadequate.

Accordingly, it is an object of this invention to provide infrared electronic countermeasures.

In accordance with one aspect of the invention, there is provided apparatus for jamming or damaging photoconductive and photoemissive detectors with laser and microwave sources; including means to detect and align the laser or microwave source with an enemy's equipment.

The above-mentioned and other features and objects of this invention will become more apparent by reference to the following description taken in conjunction with the accompanying drawings, in which:

FIG. 1a is a sketch illustrating a microwave source which can be employed in the embodiment of FIG. 1;

FIG. 4 is a sketch of an integrating image tube aiming unit for use in the embodiment of FIG. 1.

In the hereinafter described embodiment of the present invention, I prefer to employ a laser beam or a microwave beam as a source of radiation for jamming or damaging an enemy's infrared detection capability by irradiating an enemy's detector with a source of irradiation. The source of jamming irradiation is preferably mounted on a tripod in conjunction with a telescope for aiming the source of jamming irradiation during a daylight operation. An image converter tube also mounted in conjunction with the source of jamming irradiation is employed for acquiring a target during nighttime operation and for aiming the source of jamming irradiation thereat. Also employed is an integrating image tube which can be used to acquire a target and aim the source of jamming irradiation thereat when the target emits only short pulses of light which would preclude an observer from aiming the source of jamming irradiation because the observation time would be much too short.

Figure 1:
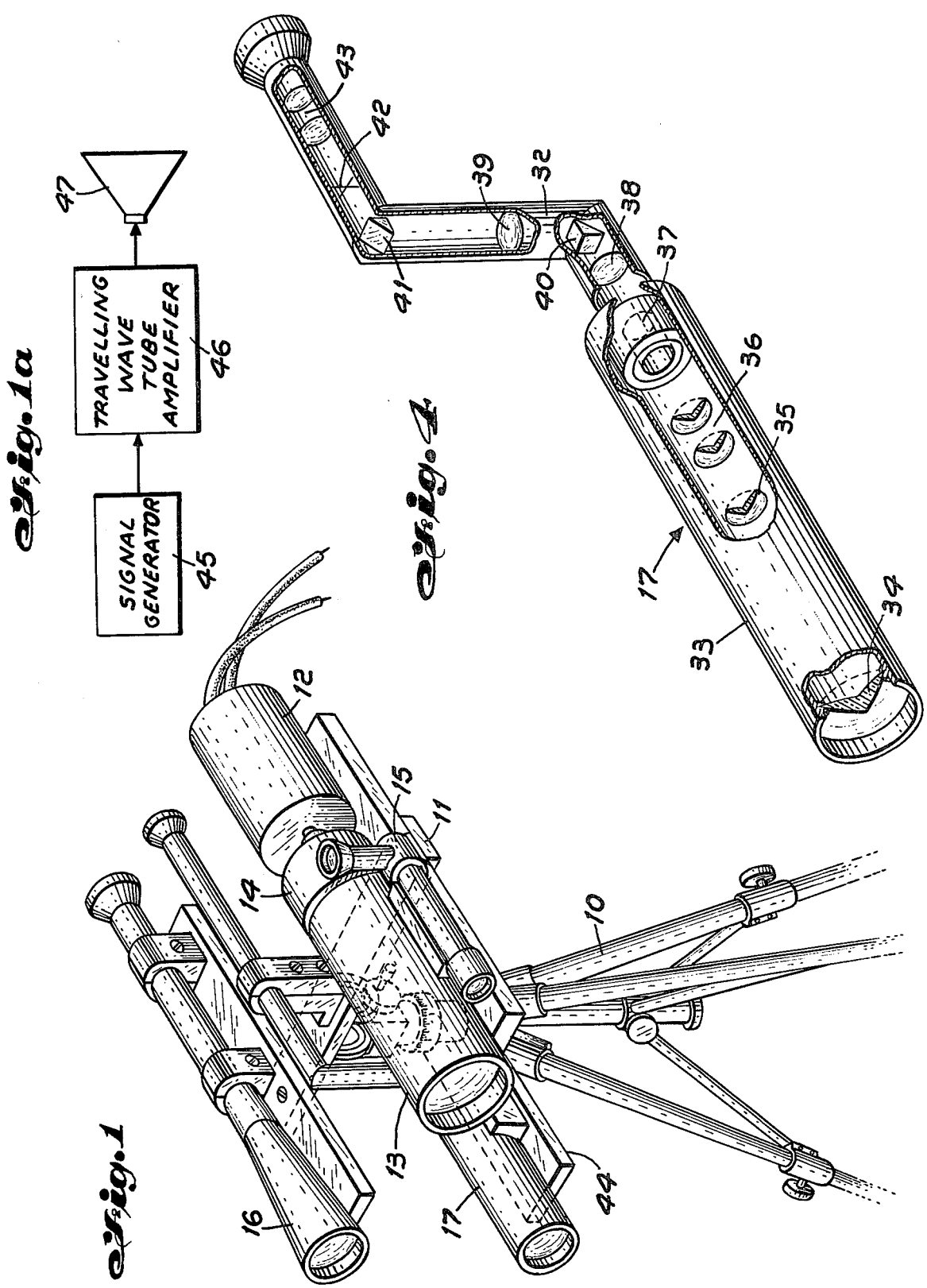
FIG. 1 is a sketch illustrating a preferred embodiment of the invention.

FIG. 1 illustrates a practical embodiment employing the invention, comprising a tripod 10 having a mounted platform 11 which is adjustable in azimuth and elevation. Arranged on mounting platform 11 of tripod 10 is a laser head 12, to be described hereinafter. The output from laser head 12 is fed to collimating optics 13. In one embodiment of the invention, a Q-switch assembly 14 is coupled between laser head 12 and collimating optics 13. Also arranged on mounting platform 11 is a telescope 15, a proximity focused tube image converter telescope 16, and an integrating image tube aiming unit 17. The relative relationships between the aiming telescope, laser head, image converter telescope, and integrating image tube aiming unit are described hereinafter.

Power supplies to operate the laser head and image tubes are not shown since they are of conventional design.

Figure 2:
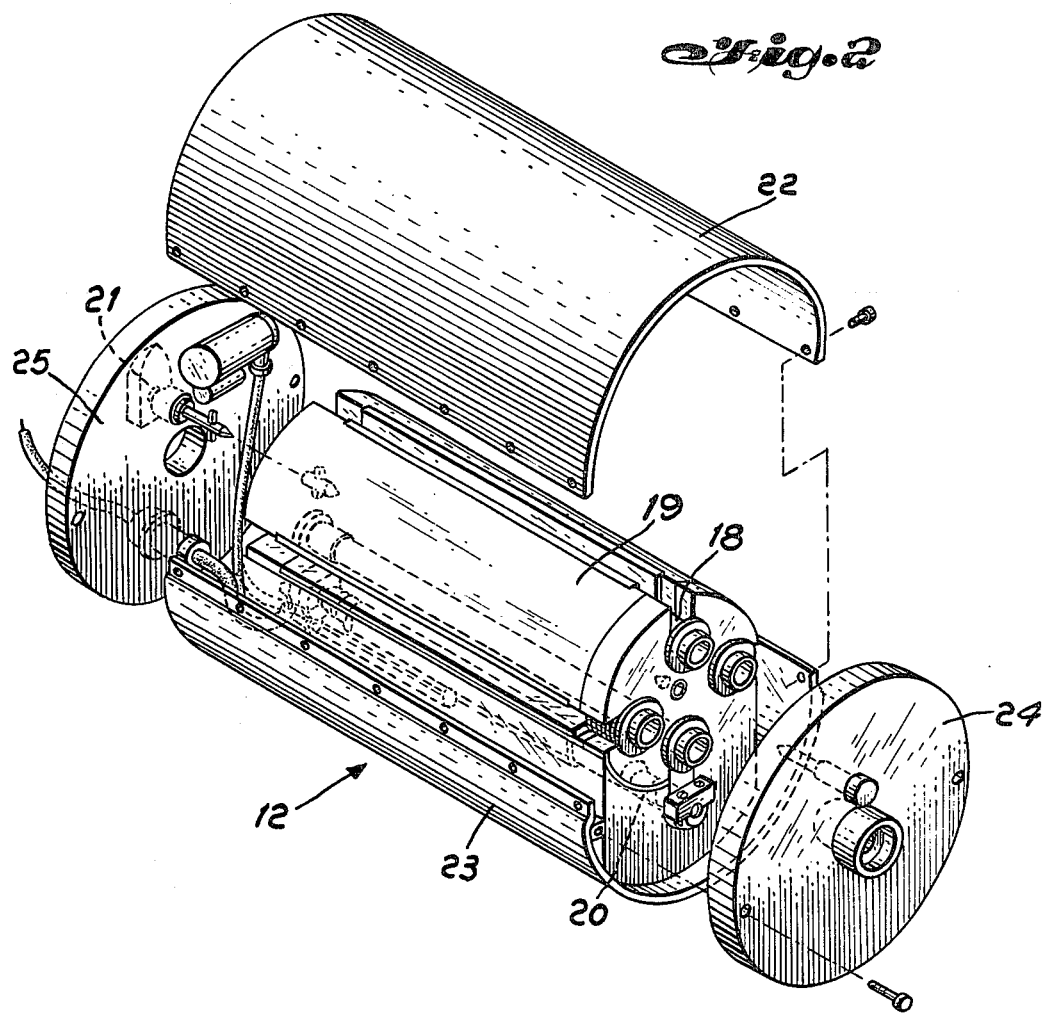
FIG. 2 is a sketch illustrating a multiple rod laser head for use in the embodiment of FIG. 1.

FIG. 2 illustrates one embodiment of multiple rod laser head 12. There is shown therein provisions for mounting four laser rods 18 in a turret assembly 19. It is of course obvious that either more or less laser rods could be provided, it being a matter of engineering choice only that four were selected for the hereindescribed laser head. The plurality of laser rods 18 is required in order to produce coherent light at more than one wavelength. A flashlamp 20 is provided in laser head 12 for supplying pumping energy to the individual laser rods 18. In the preferred embodiment, metallic reflectors with highly polished silver coatings enclose each rod and are brought into optical alignment with the similarly shaped cavity surrounding the straight tube flashlamp 20. Cooling air at ambient temperature could be introduced by, for example, a high velocity, high pressure blower, but this is not shown. The turret 19, laser rods 18 and flashlamp 20 are mounted in a canister which includes a top portion 22, a bottom portion 23 and front and back pieces 24 and 25. A Q-spoiler 14 can be employed with the laser head (see FIG. 1). Q-switch 14 could employ a retroreflecting prism with a flat polished segment on the roof for laser output and a drive motor (not shown) could be provided for the prism with external adjustment for synchronizing the triggering of flashlamp 20 to the prism position to allow for maximum energy output in giant pulses. As mentioned before, laser head 12 may be used without a Q-spoiler. Collimating optics 13 would be rigidly bolted to mounting platform 11 and may be utilized either with or without Q-switch assembly 14.

Figure 3:
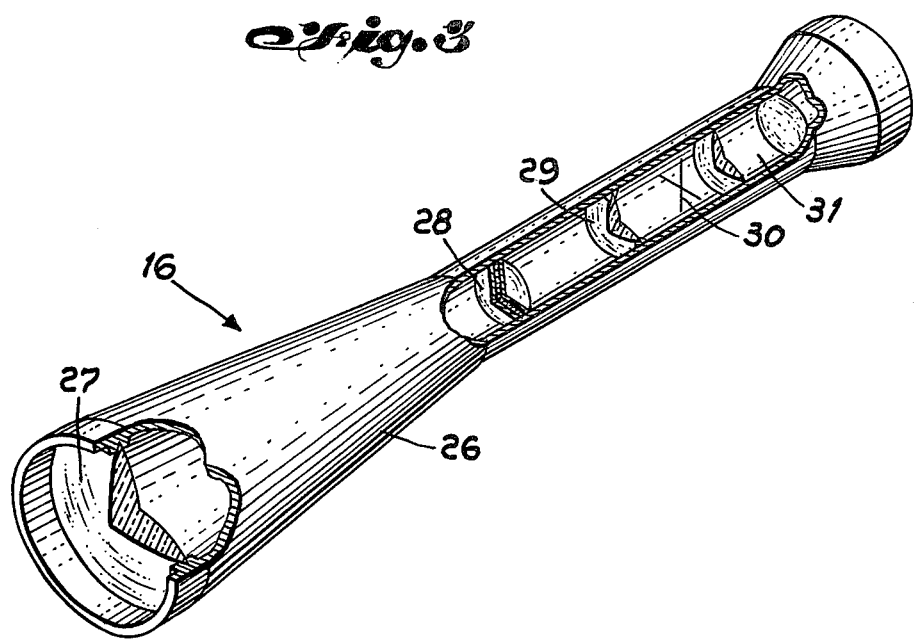
FIG. 3 is a sketch illustrating a proximity focused tube image converter telescope for use in the embodiment of FIG. 1.

FIG. 3 illustrates a proximity focused tube image converter telescope 16. The image converter telescope includes a housing 26 having an objective lens 27 mounted in the forefront thereof, a proximity focused tube (PFT) 28 in approximately the center thereof, an erector lens 29 back from the PFT, crosshairs 30 and an ocular 31. The objective lens 27 forms an inverted image of a scene on the photocathode of proximity focused tube 28. In the preferred embodiment of the invention, the photocathode of proximity focused tube 28 has an S-1 surface. The photoelectrons resulting from an image incident on the photocathode of the PFT are accelerated by a potential difference of about, for example, 5 kv originating at a power supply (not shown) to the phosphor screen of PFT 28 where a portion of their kinetic energy is transformed into visible light. The image of the scene on the phosphor screen is orientated in the same way as the image on the photocathode, that is, inverted. Erector lens 29 forms an image of the phosphor in the plane of crosshairs 30, and oriented so that the scene appears in its true orientation. The observer views this image through ocular 31. A filter (not shown) may be placed in front of objective lens 27 to isolate bands within the spectral region of the photocathode.

FIG. 4 is a sketch of integrating image tube aiming unit 17 which comprises a viewing section 32 and an image tube section 33. Viewing section 32 is movable with respect to image tube section 33 in order to accomplish the aiming function, which is described in more detail hereafter. The image tube section consists of an objective lens 34, a field lens 35, an erector lens 36 and an integrating image tube (IIT) 37. Viewing section 32 of integrating image tube 17 includes two relay lenses 38 and 39 and two right angle prisms 40 and 41, crosshairs 42 and an ocular 43. When a pulse of light from a source in the field of view is collected by objective lens 34, it is focused in the plane of field lens 35, refracted by field lens 35 (the function of field lens 35 is to allow full use of the objective) to erector lens 36 and imaged onto the photocathode of image integrating tube 37 which is operating in the "write" phase. When integrating image tube 37 is switched over to the "read" phase, a visible image is formed on the phosphor screen thereof, which image is orientated in the same way as the scene in the field of view of the system, namely, erect. The image of the scene on the phosphor screen of integrating image tube 37 is relayed by means of relay lenses 38 and 39 and right angle prisms 40 and 41 to the plane of crosshairs 43, where it is viewed by an observer through ocular 43. The relay lenses accomplish the two-fold task of forming an upright image in the plane of crosshairs 42, and more important, of permitting rotational movement of viewing section 32 with respect to image tube section 33, about axes of rotation which coincide with the azimuth and elevation adjustment axes of tripod 10 (FIG. 1). The axis of rotation are located at a distance from the phosphor screen equal to the focal length of the optical system of image tube section 33. This rotational movement is the key to the aiming of laser head 12 at a pulsed light source, even if only one pulse is detected.

A spotting telescope 15 is arranged on mounting platform 11 of tripod 10 for visible observation and for facilitating boresighting of laser head 12 and its associated optical system with image converter telescope 16 and integrating image tube aiming unit 17.

The proximity focused tube image converter telescope 16 is employed for acquiring target light sources which are operative for several seconds and radiate in the spectral region of its photosurface, which in the preferred embodiment is an S-1 surface, and for aiming laser head 12 and its associated objects at the acquired target. The integrated image tube unit 17 is for acquiring target light sources which are operative for milliseconds or less and radiate in the spectral region of its photosurface (which in the preferred embodiment is an S-20 surface) and for aiming laser head 12 and its associated objects at the acquired target. The spotter telescope 15 is for aiming laser head 12 at a target under favorable lighting conditions (especially for test during daylight hours) and for facilitating alignment of the laser system, image converter telescope, and integrating image tube.

Prior to use of the system illustrated in the preferred embodiment of FIG. 1, an alignment or boresighting of the units is required. Alignment or boresighting is defined as causing the optical axes of the various units to be parallel. Alignment may be accomplished by use of an aiming chart, which consists of an array of targets, some of which are illuminated, located so as to correspond in position to the relative locations of the optical units to be aligned. The alignment chart is located at a distance far enough away from the optical equipment so as to be properly focused, for example, 100 meters. For alignment, the laser beam from laser head 12 is directed through its optical system 13 in the direction of the alignment chart. The chart is moved, or tripod mounting platform 11 adjusted in azimuth and/or elevation, until subsequent laser pulses impinge on the laser area of the alignment chart. The coupling of spotting telescope 15 to mounting platform 11 is then adjusted so that the appropriate portion of the alignment chart is centered in the crosshairs of spotting telescope 15. This insures the parallelism of the laser optical axis and the spotting telescope optical axis. Next, the appropriate area of the alignment chart is illuminated and observed through the image converter telescope subsystem. Image converter telescope 16 coupled to tripod mounting platform 11 is adjusted until its alignment chart target is centered in its crosshairs. This insures the parallelism of the PFT optical system with the laser optical system and with the spotting telescope. Image tube section 33 of integrating image tube unit 17 is attached by a plate 44 (see FIG. 1) to the aiming circle of tripod 10 which can rotate about an axis (approximately vertical) independent of tripod mounting platform 11. Image tube section 33 is rotated about the vertical axis until the azimuth bearing is such as to center the stored image of the illuminated target on the phosphor screen. If necessary, one leg of tripod 10 may be adjusted to provide elevation correction, followed by an adjustment of tripod platform elevation control until the spotting telescope 15 is back on its target. Next, the coupling between viewing section 32 of the integrating image tube unit 17 and tripod mounting platform 11 is adjusted until the stored image on the center of the integrating image tube phosphor is centered on crosshairs 42. Thus there is insured the parallelism of the laser axis and the axis of the ocular 43 and, moreover, the symmetry of the field of view of the integrating image tube.

When a target is found, aiming of the proximity focused tube image converter telescope 16 is accomplished by adjustment of the azimuth and elevation controls of tripod mounting platform 11 until the desired target is centered in the crosshairs 30. In this manner the laser head 12 boresighted to image converter telescope 16 is properly aimed.

When the target can be observed only by observing a short pulse of light, the integrating image tube aiming unit 17 is employed. A light pulse from a source in the field of view results in a stored visible image of the source on the phosphor screen of the integrating image tube 37, as described hereinbefore. This image is viewed by the observer, magnified and correctly oriented, in the plane of crosshairs 42 through ocular 43. Viewing section 32 is moved about the axis of rotation described above until the stored image of the light source is centered in crosshairs 42. Thus the optical axis of the ocular-cross-hair assembly is then pointing in the same direction with respect to the optical axis of the objective, as the direction from which the light pulse originated. The ocular-crosshair-relay assembly is boresighted to the laser head and laser optics and attached to the same mounting plate.

While a laser head has been used in the preferred embodiment as the source of jamming irradiation, a source of microwave energy in the X-band could be employed and replace laser head 12 (see FIG. 1a). The source of microwave energy includes a signal generator 45, a travelling wave tube amplifier 46 and a directional antenna 47. Thus, it is to be understood that the embodiments shown are to be regarded as illustrative only, and that many variations and modifications may be made without departing from the principles of the invention herein disclosed and defined by the appended claims.

I claim:

1. An infrared electronic countermeasure device for interfering with an enemy's detection capability by jamming or damaging his detector, comprising:
a source of jamming irradiation;
means for detecting a target; and
means coupled to said detecting means for aiming said source of jamming irradiation at said detected target,
said target detecting means including a proximity focused image converter tube, an objective lens system, an erector lens, crosshairs and an ocular whereby said objective lens system forms an inverted image of a target at the photocathode of said proximity focused image converter tube, which image is transferred to the phosphor screen thereof, furthermore said image is transferred to the plane of said crosshairs by said erector lens and orientated to its true orientation for viewing through said ocular.

2. An infrared electronic countermeasure device for interfering with an enemy's detection capability by jamming or damaging his detector, comprising:
a source of jamming irradiation;
means for detecting a target; and
means coupled to said detecting means for aiming said source of jamming irradiation at said detected target,
said target detecting means including a viewing section and an image tube section, said image tube section including an integrating image tube, an objective lens, a field lens, and an erector lens, whereby a light pulse from a target is collected by said objective lens, focused in the plane of said field lens, refracted by the field lens to the erector lens and imaged onto the photocathode of said integrating image tube which is operated in the "write" phase, said image being formed on the phosphor screen of said integrating image tube when said integrating image tube is switched to the "read" phase, said image being transferred to said viewing section of said target detecting means.

3. An infrared countermeasure device as in claim 2 wherein said viewing section of said target detecting means includes crosshairs, a plurality of lenses and prisms to relay the image formed on the phosphor screen of said integrating image tube to the plane of said crosshairs, and an ocular for viewing said image.

4. An infrared countermeasure device as in claim 3 further including means for coupling said viewing section to said image tube section so as to be able to move with respect thereto.

5. An infrared electronic countermeasure device for interfering with an enemy's detection capability of jamming or damaging his detector, comprising:
a mounting platform which is adjustable in azimuth and elevation;
a radiation head having means to radiate a beam of jamming irradiation coupled to said mounting platform; and
means for detecting a target and aiming said radiation head thereat, said target detecting and aiming means including a telescope coupled to said mounting platform and boresighted with said radiation head.

6. An infrared electronic countermeasure device as in claim 5 in which said target detecting and aiming means further includes an image converter tube and associated optics boresighted with said radiation head and telescope.

7. An infrared electronic countermeasure device for interfering with an enemy's detection capability by jamming or damaging his detector, comprising:
a mounting platform which is adjustable in azimuth and elevation;
a radiation head having means to radiate a beam of jamming irradiation coupled to said mounting platform; and
means for detecting a target and aiming said radiation head thereat, said target detecting and aiming means including an integrating image tube with associated optics and a viewing section for said integrating image tube, said viewing section and said integrating image tube section being movable with respect to each other, with said viewing section being boresighted with said radiation head such that said integrating image tube section can be rotated to acquire a target and then said viewing section moved to aim said radiation head at said detected target.

* * * * *